Figure 1:
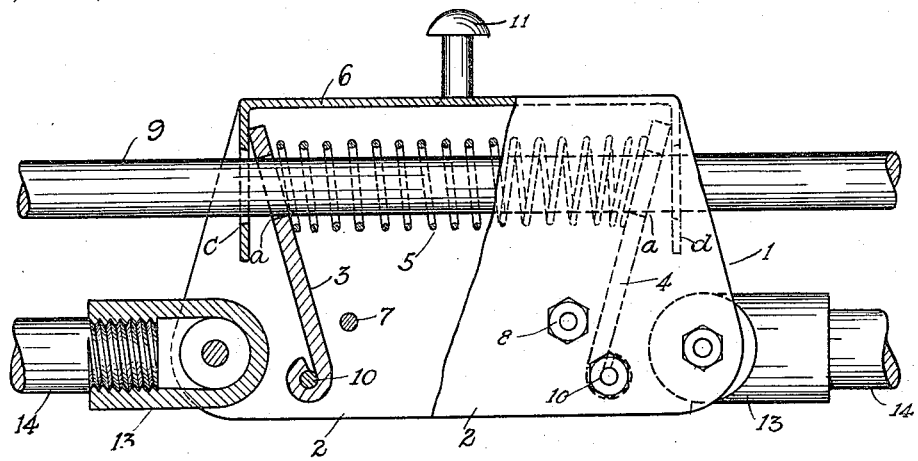

W. A. HALL.
STEERING APPARATUS.
APPLICATION FILED FEB. 8, 1915.

1,173,717.

Patented Feb. 29, 1916.

WITNESSES

INVENTOR
WILLIAM A. HALL
by E. E. Rodabaugh
Attorney stantly remains locked until released by the operator; second, to provide such a device that is simple, durable and easily understood; third, to provide such a device that may be easily and quickly applied to any motor vehicle, and fourth, to provide such a device that can be economically and cheaply constructed.

UNITED STATES PATENT OFFICE.

WILLIAM A. HALL, OF SAN DIEGO, CALIFORNIA, ASSIGNOR OF ONE-HALF TO RENHART R. HERING, OF CROSBY, NORTH DAKOTA.

STEERING APPARATUS.

1,173,717.  Specification of Letters Patent.  Patented Feb. 29, 1916.

Application filed February 8, 1915. Serial No. 6,956.

*To all whom it may concern:*

Be it known that I, WILLIAM A. HALL, of the city of San Diego, San Diego county, State of California, have invented an Improvement in Steering Apparatus, of which the following description, together with the accompanying drawings, is a specification.

Like characters on the drawing represent like parts.

The object of my invention is the production of a novel steering apparatus by which the steering member is always under the control of the operator, and in which the steering means is always automatically locked in any position until released by the use of the controller means by the operator when he desires to change the position of the steering member.

My invention is adapted to be used on any form of vehicle that is to be guided in a desired direction by a steering means, whether such vehicle is intended to travel in the air, in the water or on land; but I have chosen to illustrate it in this instance as used as an apparatus for an automobile.

In the operation of motor vehicles it has been practically demonstrated that when one of the front or steering wheels of the vehicle strikes a rut, stone or other obstruction, it has a tendency to change the course of the vehicle and to cause the driver to lose control by reason of the force with which the wheel comes into contact with such obstruction, and in many cases serious accidents have resulted from the temporary loss of such control.

In my invention I have provided a means for automatically locking the steering member at all times in any position, so that said steering member can at no time, without the direct act of the operator, be released or changed in its direction.

Therefore, the objects of my invention are, first, to provide such a device that constantly remains locked until released by the operator; second, to provide such a device that is simple, durable and easily understood; third, to provide such a device that may be easily and quickly applied to any motor vehicle, and fourth, to provide such a device that can be economically and cheaply constructed.

Figure 2:
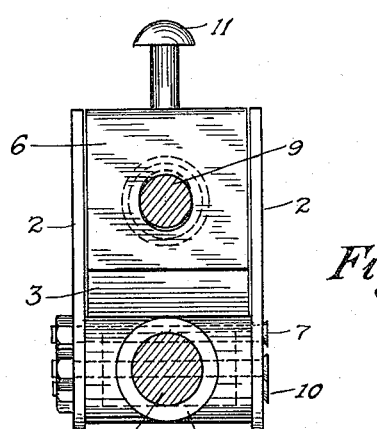
Figure 3:
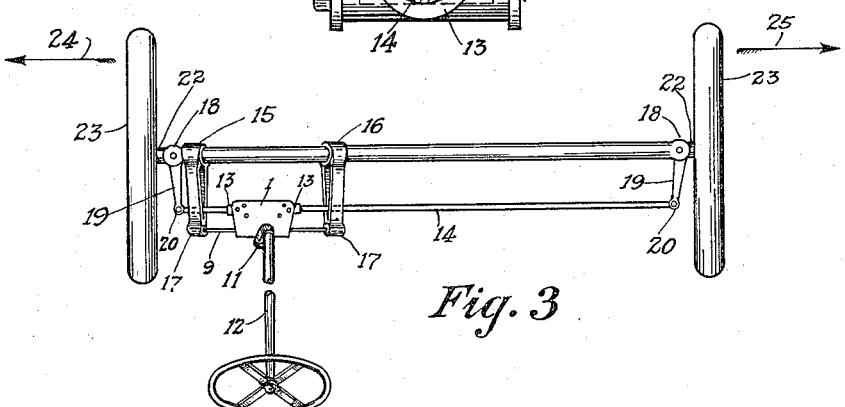

In the accompanying drawings, Figure 1 is an enlarged plan view of the locking device with a portion of the casing broken away and showing a part thereof in section for the purpose of fully illustrating the same; Fig. 2 is an end view of the locking device, and Fig. 3 is a partly perspective view of the steering mechanism complete, shown in connection with the front axle and wheels of an automobile.

The numeral 1 designates the locking device, the principal parts of which are the two casing members 2, the two clamping members 3 and 4, the spring member 5, the releasing member 6, the stop members 7 and 8, and the supporting member 9.

The clamping members 3 and 4 are each pivotally mounted at one end on the pivot members 10, which are mounted in the casing members 2. These clamping members 3 and 4 are provided near their free ends at "$a$" with holes of a size enough larger than the supporting member 9 to allow said support 9 to be inserted therein, and allow a sufficient freedom of movement on said support 9 so that the free ends of said clamping members 3 and 4 may be forced horizontally from a perpendicular position thereto on said support 9, sufficiently, to cause the edges of the said clamping members 3 and 4, adjacent to said support 9, to contact with the support 9 so as to clamp or cling firmly to said support 9. The support 9 is firmly mounted at each end of the vehicle on the supports 15 and 16, at their extended ends 17. The spring member 5 is disposed on said supporting member 9 between the said clamp members 3 and 4 and is adapted to keep the ends of said clamping members 3 and 4 forced apart so that said clamping members are held tightly in contact with the support 9. Mounted in the casing are two stop members 7 and 8. The stop 7 is located above the pivot 10 on which the member 3 is mounted, and the stop 8 is located above the pivot 10, on which the support 4 is mounted. These stop members 7 and 8 are respectively placed relatively to the clamping members 3 and 4 so as to prevent them from swinging toward each other sufficiently to clamp on the support 9, and the said members 7 and 8 also act as fulcrums to facilitate the reciprocation of the locking device 1 on the support 9 when one of the portions $c$ or $d$ of the releasing member 6 is forced against either of the clamping members 3 or 4 by the application of power to the releasing member 6 at lug 11. The releasing member 6 is U-shaped, having the portions "c" and "d" thereof parallel to each other, and the distance between the said two end portions is equal to, or greater, than the distance between the ends of the clamping members 3 and 4 when said clamping members are forced apart by the spring 5. In each end portion of the releasing member 6, and opposite to each other and in line therewith, is provided a hole adapted to have inserted therein the support 9, which said holes are of such a size as to allow said releasing member 6 to reciprocate freely on said support 9. Mounted on said releasing member 6 is a lug or post 11 adapted to have attached thereto a means 12 for applying a force sufficient to move the locking device horizontally on the support 9. The locking device 1 is also provided at its opposite ends with means 13 for attaching it to the connecting rod 14 of the steering apparatus.

The steering wheels 23 of the vehicle are pivotally mounted at 18 on the vehicle. The connecting rod 14 is pivotally connected at each end at 20 to the lugs 19, which are rigidly attached to the axles 22 of the steering wheels 23, preferably at right angles thereto.

The arrows 24 and 25 indicate respectively the directions of the vehicle, left and right.

The operation of my steering apparatus is as follows: The clamping members 3 and 4, being engaged with the support 9 and held in the position as shown best in Fig. 1, in order to change the direction of the steering wheels 23 it is necessary that the locking means 1 shall be reciprocated on the support 9, and if the releasing member 6 be forced in the direction of clamping member 3, the clamping member 4 will be turned on the pivot 10 and be swung out of clamping contact with the support 9 against the stop 8, and, by applying sufficient force to the releasing member 6 at 11, the locking device 1 will be forced along the support 9, carrying with it the connecting rod 14, which will cause the steering wheels 23 to be turned toward the right, and, if the force at 11 be removed, the spring 5 will immediately force the clamping members 3 and 4 back into clamping engagement with the support 9. If it be desired to change the direction of the steering wheels in the opposite direction, this may be done by moving the releasing member in the opposite direction, or toward the clamping member 4, thereby releasing the clamping member 3, and the connecting rod 14 will then be carried with the locking device 1 in the same direction, and the steering wheels 23 will be turned toward the left.

It is obvious that with this construction and arrangement of parts there is provided a steering apparatus that remains locked until released by the operator; that is simple, durable, and easily understood; that can be easily and quickly attached to any motor vehicle, and that is inexpensive and economic of construction.

Having thus described my invention, what I claim as new and desire to secure by Letters Patent, is:

1. In a steering apparatus, a supporting member mounted rigidly on other supports on a vehicle, a plurality of clamping members each pivotally mounted at its one end in a casing forming part of said steering apparatus, and at the other end reciprocally mounted on said first supporting member and adapted to clamp thereon, means mounted in said casing adapted to regulate the swing of said clamping members and facilitate the reciprocation of said steering apparatus on said first named supporting member, means for holding said clamping members in clamping contact with said support, and a means for releasing said clamping members.

2. In a steering apparatus, a supporting member mounted rigidly on a vehicle, a casing reciprocally mounted on said support member and attached to and carried by the steering rod of the vehicle, a plurality of clamp members each pivotally mounted at one end in said casing and at the other end reciprocally mounted on said support, spring means mounted on said support between said clamp members adapted to force said clamp members into clamping engagement with said support, a release means reciprocally mounted on said support adapted to release said clamp members, stop means in said casing adapted to limit the swing of said clamp members, and means mounted in said casing to facilitate its connection to the means controlling the steering member of said vehicle.

3. In a device of the character described, a plurality of clamping members each at one end pivotally mounted in a casing forming a part of said device, and the other end of each reciprocally mounted on a support rigidly mounted on the steered vehicle, means reciprocally mounted on said support to force said clamping members apart and into clamping engagement with said support, stop means mounted in said casing to regulate the swing of said clamp members, a means reciprocally mounted on said supporting member adapted to release said clamping members, and a means adapted to be connected with a power means to reciprocate said casing, clamping members, spring means and releasing member on said support, mounted on said releasing member.

4. In a device of the character described, a support rigidly mounted on the steered vehicle, a plurality of clamping members each pivotally mounted at one end in a casing forming a part of said steering apparatus and provided near the other end with a hole sufficiently large to allow it to be mounted on said support and to reciprocate freely thereon, coil spring means mounted on said support between said clamping members and in contact therewith, a U-shaped releasing member reciprocally mounted on said support, including, between its two ends, said clamping members and spring means, and adapted to release said clamping members, and with said clamping members and coil spring member to slide longitudinally on said support, a means mounted on said releasing member adapted to facilitate its reciprocation on said supporting member, and means mounted in said casing adapted to regulate the swing of said clamping members and facilitate the reciprocation of said steering apparatus on said first named supporting member.

In testimony whereof I have hereunto subscribed my name in the presence of two subscribing witnesses.

WILLIAM A. HALL.

Witnesses:
P. A. PULLEY,
ELMER E. RODABAUGH.

Copies of this patent may be obtained for five cents each, by addressing the "Commissioner of Patents, Washington, D. C."